Jan. 6, 1931.                    G. C. MORUE                    1,787,831
                              SUCKER ROD COUPLING
                              Filed July 14, 1928

Inventor
G. C. Morue,

By Clarence A. O'Brien
                    Attorney

Patented Jan. 6, 1931

1,787,831

UNITED STATES PATENT OFFICE

GEORGE C. MORUE, OF CROMWELL, OKLAHOMA

SUCKER-ROD COUPLING

Application filed July 14, 1928. Serial No. 292,755.

The present invention relates to improvements in sucker rods and has reference more particularly to an improved construction of the rod facilitating the connection of the adjacent ends thereof.

One of the important objects of the present invention is to provide a sucker rod connection or coupling which will obviate the necessity of having to employ the use of screw threads such as are now used for affording a connection between the adjacent ends of the sucker rod.

A further object is to provide a sucker rod connection wherein locking means is provided for positively securing the rod sections together in assembled relation, means being provided whereby said locking means may be actuated to facilitate the disengagement of the connection whenever it is necessary to separate the sucker rod.

Still a further object is to provide a sucker rod connection of the above mentioned character which is simple in construction, inexpensive, strong and durable and further well adapted to the purpose for which it is designed.

Other objects and advantages will become apparent during the course of the following description.

Figure 1:
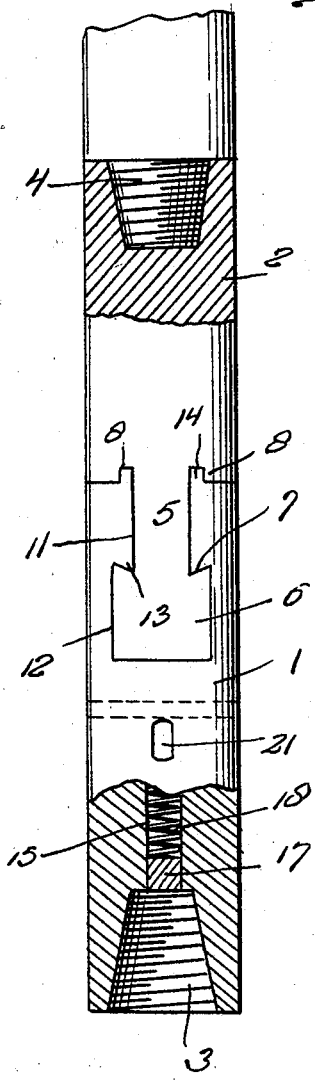
Figure 2:
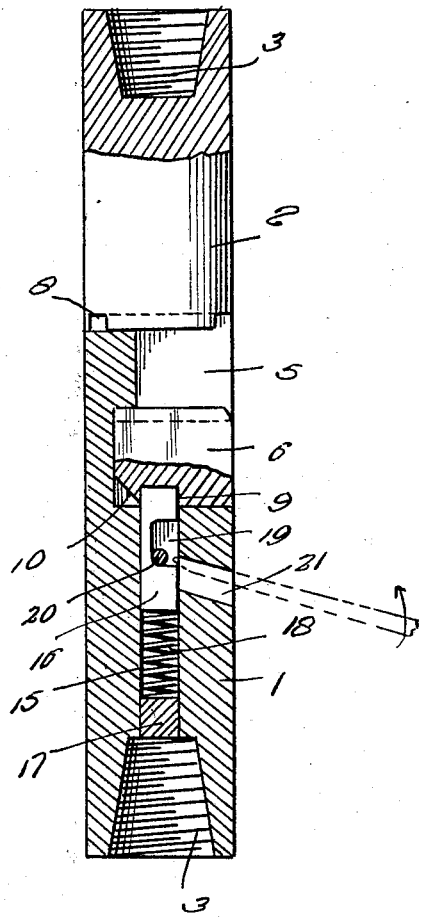

In the accompanying drawing, forming a part of this specification, and in which like numerals indicate like parts throughout the same:

Figure 1 is a view partly in elevation and partly in section of the sucker rod connection embodying my invention, and Figure 2 is a view at right angles to Figure 1 for more clearly disclosing the manner in which a spring pressed lath locks the sucker rod sections together in connected relation with each other.

In the drawings wherein for the purpose of illustration is shown a preferred embodiment of my invention, the numerals 1 and 2 designate a pair of adjacent sucker rods. As clearly shown in the drawing, the outer ends of these sucker rods are formed with internally threaded tapered sockets 3 for connection with the adjacent ends of additional sucker rod sections that are formed with threaded necks as shown at 4.

Formed on the lower end of the upper sucker rod 2 is the substantially rectangular shaped shank 5, the same extending from one side of the sucker rod to a point in spaced relation to the opposite side as clearly suggested in Figure 2 and formed on the lower end of said shank is the enlarged head 6 which is substantially rectangular in end elevation.

The head has its outer face lying flush with the outer face of the shank while the inner end or face of this head extends slightly beyond the adjacent edge or face of the shank as shown in Figure 2. Furthermore the upper face of the head is cut away at an angle as illustrated at 7.

The purpose thereof will be presently described. The lower end of the solid sucker rod 2 is formed on opposite sides of the shank 5 with the parallel spaced slots or grooves 8 that extend entirely across the sucker rod.

The bottom face of the inner end portion of the enlarged head 6 is formed with a recess 9 and the lower inner corner of the head is beveled to provide the nose 10 as shown in Figure 2. The upper end of the lower sucker rod 1 is formed with a vertically disposed slot 11 that extends downwardly from the top face of the sucker rod 1 and this slot extends inwardly from one side of the sucker rod 1 a substantial distance to accommodate the shank 5 that depends from the lower end of the upper sucker rod 2 and the lower end of the slot 11 communicates with the enlarged socket 12 that is formed for the reception of the head 6. The shoulders formed at the juncture of the sides of this socket 12 with the slot 11 are beveled as shown at 13 to cooperate with the cutaway portions 7 formed in the upper face of the enlarged head 6 while upstanding tongues 14 are formed on the upper face of the sucker rod 1 on opposite sides of the slot 11 for sliding engagement within the cross groove 8 as also shown very clearly in the drawing.

The sucker rod 1 is furthermore formed with a longitudinal bore 15 and the lower portion thereof which extends from the closed end of the socket 3 to the socket 12 and arranged for slidable movement in the upper portion of the bore 15 is the latch 16, the upper end being adapted to engage within the recess 9 formed in the bottom of the head 6 to secure the parts together in assembled relation.

A plug 17, removably fitted in the lower end of the bore 15, and an expansible coil spring 18 is arranged within the bore 15 for disposition between the plug 17 and the lower end of the latch 16 for normally urging the latter upwardly. As is more clearly disclosed in Figure 2, the latch 16 is cut out in one side thereof at its intermediate portion as at 19 and a cross pin 20 is arranged in the sucker rod 1 for disposition through the bore 15 and the cut out portion 19 for facilitating the sliding movement of the latch 16 in both directions.

The sucker rod 1 is furthermore formed in its outer side with the rigidly disposed opening 21 that has communication with the bore 15 and the lower portion of the cut out 19 formed in the latch 16 whereby any suitable implement may be inserted through this opening for engagement with the lower end of the cut out portion 19 to forcibly move the latch 16 downwardly in the bore 15 whereby the upper end of said latch is disengaged from the recess 9 and out of the path of movement of the head 6 whereby the upper sucker rod 2 may be slid outwardly in a lateral direction with respect to the lower sucker rod 1 to disconnect the sucker rod whenever necessary.

The sucker rod may be assembled together in the manner opposite from the construction shown, the beveled head 10 riding over the spring pressed latch 16 until the recess 9 is in position with the latch whereupon the latter will enter the recess and secure the parts in their properly connected relation.

The provision of a sucker rod connection of the above mentioned character will obviate the necessity of having to employ screw threads to connect the adjacent ends of the rods together and furthermore a connection of this character will at all times be positive and efficient and cannot accidentally become disassembled during the use of the sucker rod in a well where the sucker rod is subjected to considerable jarring action.

While I have shown the preferred embodiment of my invention, it is to be understood that various changes in the size, shape and arrangement of parts may be resorted to, without departing from the spirit of the invention and the scope of the appended claim.

Having thus described my invention, what I claim as new is:

A sucker rod coupling comprising a rod section provided with a longitudinally extending headed shank positioned to one side of the longitudinal axis of the section, a second rod section having a longitudinally extending slot adjacent to one edge and opening laterally of the section and undercut to receive the said depending shank of the adjacent section, said slotted section having an axial opening communicating with said slot, a slidable latch member within said axial opening, a fixed cross pin within said axial opening and extending through a slot in the said latch member for limiting the longitudinal sliding movement thereof, said slotted rod section having a lateral opening communicating with the said axial opening and being of such range to communicate with the slotted portion of the latch member regardless of the position of the latter, whereby any suitable implement may be inserted through the lateral opening for movement of said latch member into inoperative position, a helical spring enclosed in the said axial opening of the slotted rod section and having one end engaged with the bottom end of the latch member and a plug removably fitted in the lower end of the axial opening of the said slot section and providing a seat for the said helical spring.

In testimony whereof I affix my signature.

GEORGE C. MORUE.